Fig. 1

Inventor.
Forrest G. Purinton
by Heard Smith & Tennant.
Attys.

July 26, 1932.   F. G. PURINTON   1,868,805
ARTICLE ASSEMBLING AND CONVEYING MACHINE
Filed Nov. 2, 1927   6 Sheets-Sheet 3

Inventor.
Forrest G. Purinton
by Heard Smith & Tennant.
Attys.

July 26, 1932. F. G. PURINTON 1,868,805
ARTICLE ASSEMBLING AND CONVEYING MACHINE
Filed Nov. 2, 1927 6 Sheets-Sheet 4

Inventor.
Forrest G. Purinton
by Heard Smith & Tennant.
Attys.

July 26, 1932.  F. G. PURINTON  1,868,805
ARTICLE ASSEMBLING AND CONVEYING MACHINE
Filed Nov. 2, 1927   6 Sheets-Sheet 5

Inventor.
Forrest G. Purinton
by Heard Smith & Tennant.
Attys.

July 26, 1932.  F. G. PURINTON  1,868,805
ARTICLE ASSEMBLING AND CONVEYING MACHINE
Filed Nov. 2, 1927  6 Sheets-Sheet 6

Fig. 14.

Inventor.
Forrest G. Purinton
by Heard Smith & Tennant
Attys.

Patented July 26, 1932

1,868,805

UNITED STATES PATENT OFFICE

FORREST G. PURINTON, OF WATERBURY, CONNECTICUT, ASSIGNOR TO THE PATENT BUTTON COMPANY, OF WATERBURY, CONNECTICUT, A CORPORATION OF CONNECTICUT

ARTICLE-ASSEMBLING AND CONVEYING MACHINE

Application filed November 2, 1927. Serial No. 230,654.

This invention relates to improvements in machines for assembling a multiplicity of articles in narrowly separated juxtaposed relation and in like positions upon a travelling conveyor and is in part substantially identical with the disclosure of my prior application, Serial Number 153,512, filed December 9, 1926, for machines for assembling and coating a multiplicity of articles.

An illustrative embodiment of the invention is disclosed herein as applied to machines for assembling buttons, or like small articles, which have opposite faces of different contour, upon a travelling endless carrier. The endless carrier upon which the buttons are deposited may be utilized as a sorting table, or the endless carrier may be caused to convey the articles to or through machines for painting, coating, or otherwise treating the articles.

In the particular embodiment of the invention disclosed herein the buttons, or other articles, are placed in a hopper the bottom of which comprises an endless travelling carrier provided with means, such as recesses, to receive and to remove from the mass of articles deposited in the hopper only articles presenting faces in a predetermined position, and to assemble them in closely separated juxtaposition. The assembled articles thus removed from the mass are then transferred, either directly or indirectly, from the assembling carrier to an article-receiving conveyor which may serve as a sorting table, or which may be carried through the field of an air brush or paint gun and thence through a drier in the manner disclosed in my prior application.

One of the objects of the invention is to provide a travelling assembling carrier operable to remove from a mass of the articles similarly positioned articles in narrowly separated juxtaposition.

A further object of the invention is to provide a travelling conveyer to receive the assembled articles from the assembling carrier in the same juxtaposition and to transport them to a desired location.

A further object of the invention is to provide means for insuring the transfer of the articles from the assembling means to the conveying means without relative displacement of the articles.

A further object of the invention is to provide a novel driving mechanism for the assembling and conveying means having manually operable means for conveniently controlling the speed of movement of the assembling and conveying mechanism.

A further object of the invention is to provide a novel means for adjusting the angular position of the assembling mechanism.

Another feature of the invention consists in the provision of guiding means for the assembling carrier and the article-receiving conveyer respectively adapted to insure proper co-operative relation therebetween.

A further object of the invention is to provide means for preventing adhesion of the articles to the travelling carrier by frictional electrification of said carrier and articles.

A further object of the invention is to provide novel means for detaching the articles from the assembling carrier to insure depositing them properly upon the article-receiving conveyer.

These and other objects and features of the invention will more fully appear from the following description and the accompanying drawings and will be particularly pointed out in the claims.

An illustrative embodiment of the invention as applied to a machine for assembling buttons is illustrated in the accompanying drawings, in which.

Fig. 13 is a transverse sectional view of the same; and,

Figure 1:
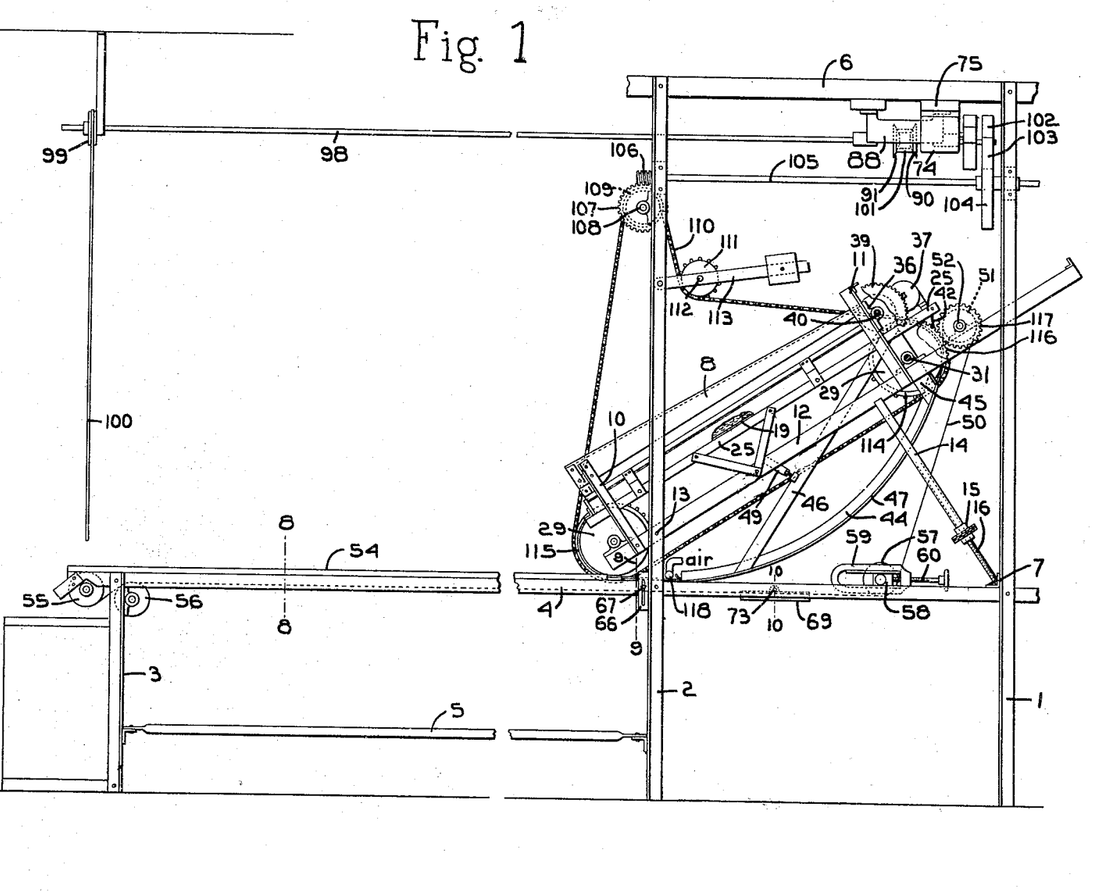
Fig. 1 is a side elevation of a relatively simple mechanism for assembling the articles in their predetermined position and narrowly separated relation and transferring the articles in inverted or reverse position to an endless conveyer.
Figure 2:
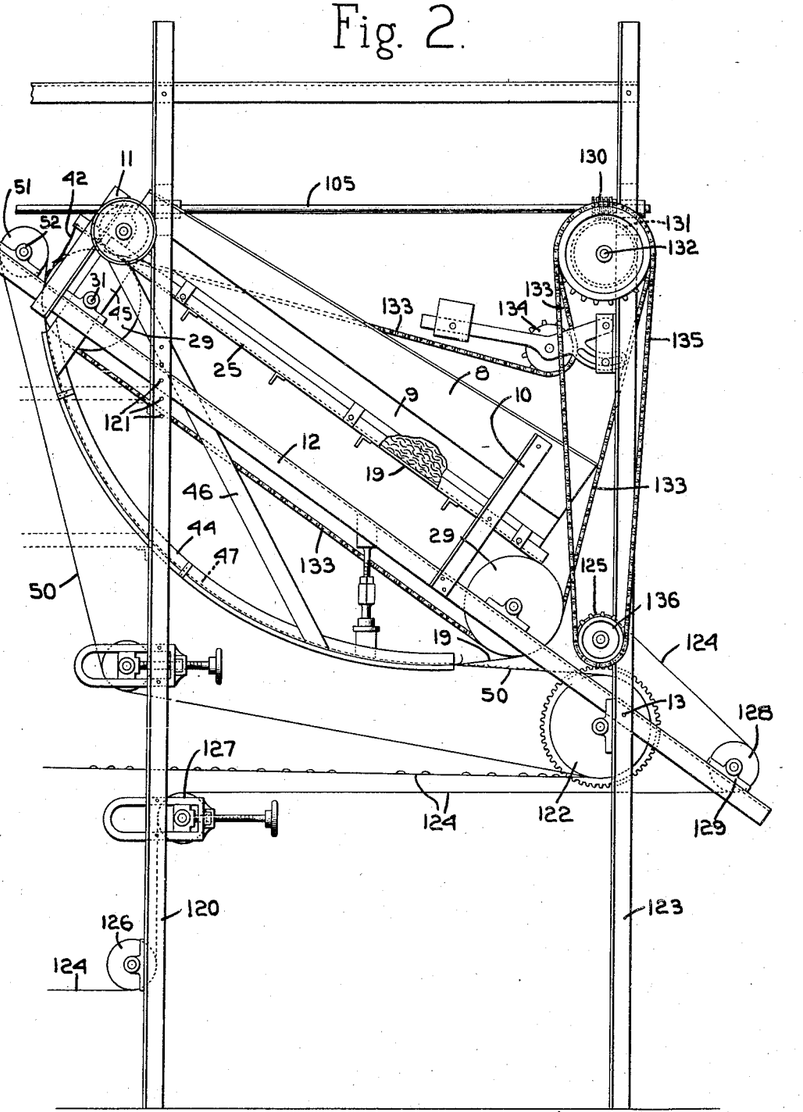
Fig. 2 is a similar view of an article-assembling mechanism having means for reversing the position of the assembled articles twice so that they are positioned upon the conveyer in the same manner as upon the assembling carrier.
Figure 14:
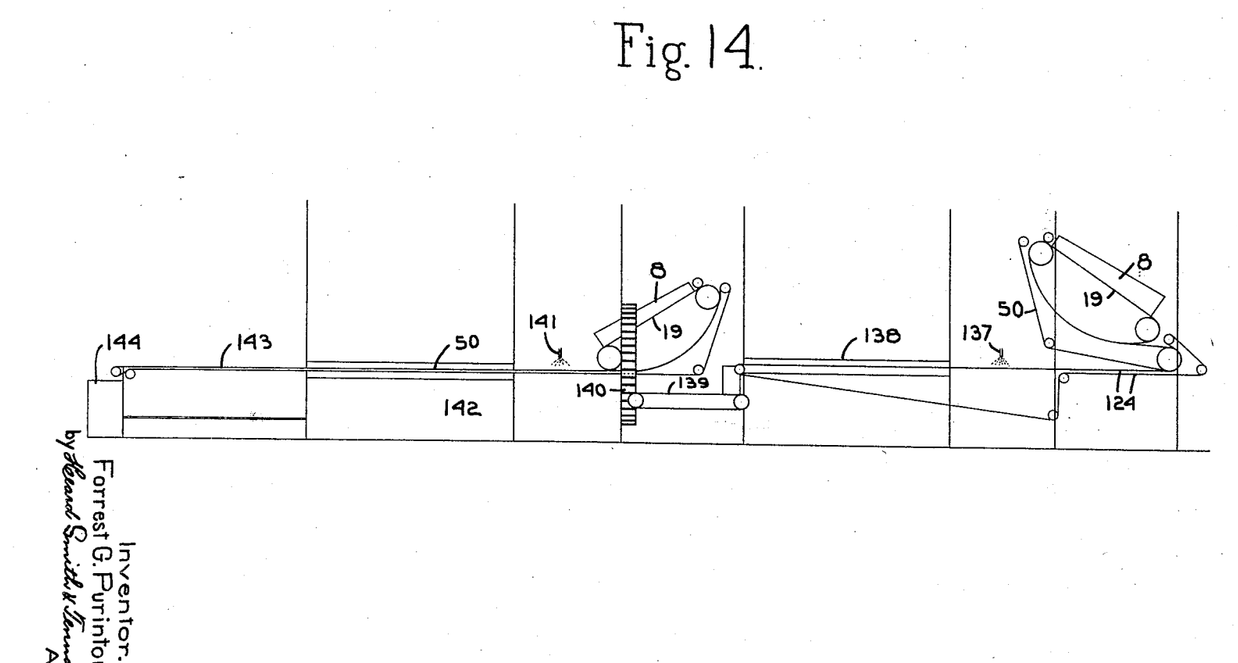
Fig. 14 is a diagrammatic view illustrating the button assembling and conveying mechanisms illustrated in Figs. 1 and 2 employed in succession in a button painting machine of the type disclosed in my prior application aforesaid.

The assembling mechanism illustrated in Fig. 1 shows the article-receiving conveyer employed as a sorting table, the articles upon the table being arranged in inverted position with respect to the manner in which they are positioned upon the assembling carrier. The assembling mechanism illustrated in Fig. 2 may be employed in a similar manner with the conveyer used as a sorting table, in which case the articles will be presented in the same position as on the assembling carrier. In Fig. 14 the assembling and conveying mechanisms are illustrated diagrammatically in associated relation as embodied in a painting machine, such as the painting machine for buttons illustrated in my prior application Serial Number 153,512 aforesaid. In the mechanism illustrated diagrammatically in Fig. 14 the assembling mechanism at the right, which corresponds to that illustrated in Fig. 2, is designed to position buttons right side up upon the receiving conveyer which carries them through the field of the button coating mechanism, thence through a drier from which they are deposited upon a travelling endless carrier. This endless carrier transfers the buttons to an elevator which in turn delivers them to the hopper of an assembling machine such as that illustrated in Fig. 1. This assembling machine assembles the buttons wrong side up upon a travelling conveyer which carries them through the field of a painting mechanism, thence through a drier and continuing presents a sorting table from which imperfect buttons may be removed and the perfect buttons delivered into a receptacle located beneath the end of the conveyer.

The frame of the machine illustrated in Fig. 1 comprises a series of pairs of uprights 1, 2, 3, which are connected together by suitable horizontal girders 4, 5, 6, to form side frames, and these side frames are in turn connected together by suitable transverse girders 7 to form a rigid frame construction. The assembling mechanism comprises an inclined hopper having side members 8 provided with downwardly converging lower portions 9 which are supported upon suitable posts 10 and 11, preferably of angle iron, upon girders 12 which, as illustrated in Fig. 1, are pivotally mounted at their lower ends upon a shaft 13 secured to or journalled in the posts 2.

The upper ends of the girders 12 are adjustably supported from the frame. The preferred construction comprises a pair of sleeves 14 which are secured at their upper ends to the girders 12 and extend downwardly therefrom approximately at right angles thereto and have at their lower ends nuts 15 which engage screw threaded rods 16 which are pivotally mounted in the angle of the transverse angle bar girder 7 which rests upon the longitudinally extending girder 4. The nuts 15 are provided with sprocket wheels 17 which are engaged by an endless chain 18. When it is desired to adjust the angular position of the hopper the operator grasps the endless chain 18 and pulls it in a direction to rotate the nuts 15 either to elevate or to lower the hopper. By reason of this construction both sides of the hopper may be raised equally so that there will be no lateral tilting of the hopper due to such adjustment. Furthermore, this adjustment can be made at any time to provide a proper inclination of the hopper which will most effectively cause the articles to fill the recesses in the assembling carrier which forms the bottom of the hopper, for it is found that buttons, or other articles, having smooth surfaces will slip over each other more easily and consequently require less inclination of the hopper to cause them properly to enter the recesses in the assembling carrier than those which present a rougher surface. It is found in practice that different kinds of buttons require a variation in the inclination of the hopper from twenty-five to forty degrees. In this connection it may be mentioned that it is desirable to have the mass of buttons in the hopper extend from the lower end thereof nearly to the upper end.

Figure 3:
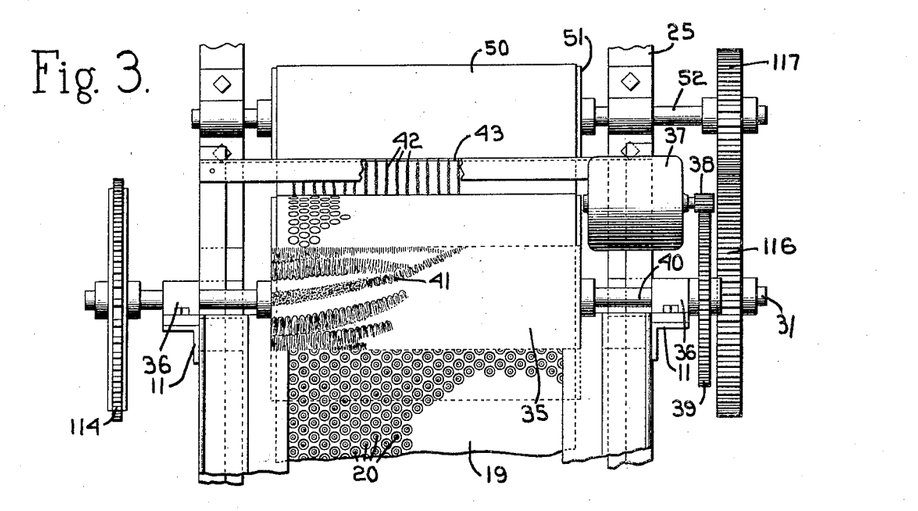
Fig. 3 is an enlarged detail view of a portion of the assembling device and the means for preventing improperly positioned articles from being removed from the mass.
Figure 4:
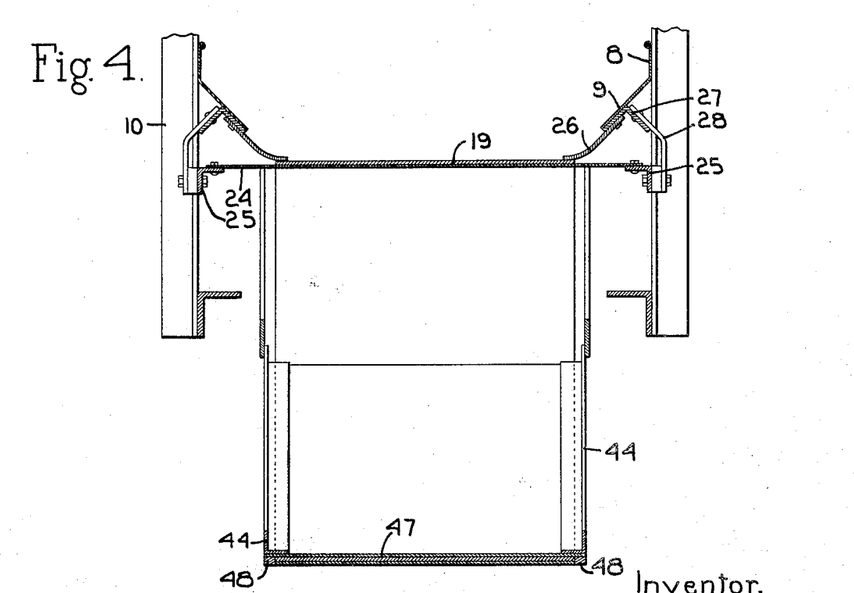
Fig. 4 is a transverse vertical sectional view through the hopper and assembling mechanism.
Figure 11:
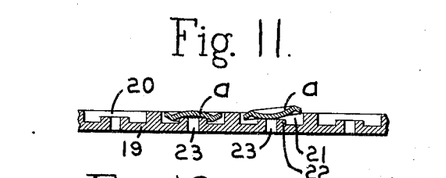
Fig. 11 is an enlarged detail sectional view of the assembling belt or carrier showing the recesses with buttons respectively lying properly and improperly within the recesses.

The assembling carrier in the preferred form illustrated herein comprises an endless belt 19 of heavy leather, or other suitable material, the upper or grain surface of which is provided with closely juxtaposed, narrowly separated, recesses 20, (see Figs. 3 and 11) which are provided with countersunk annular portions 21 leaving an upwardly extending central portion 22 which desirably is provided with a central aperture 23 to prevent buttons deposited in the recesses from being held therein by suction and in the novel construction disclosed herein to permit the utilization of a blast of air dislodging the buttons and insuring their transfer to the receiving conveyer. The recesses 20 are so shaped as to receive a button $a$ of usual character with the central portion of its usually exposed face resting upon the upwardly extending central portion 22, this portion being of such height that when the button is properly positioned in the recess the back of the button will be substantially flush with the plane of the upper surface of the assembling carrier. However, when the upwardly extending central portion 22 is engaged by the reverse face or back of the button, as illustrated in Fig. 11, the button will be held above the plane of the upper surface of the assembling carrier and will fall out of the recess, or may be readily removed from the recess by suitable doffing mechanism.

The upper lead of the assembling carrier 19, which forms the bottom of the hopper, is supported upon a plate 24 which is mounted on suitable angle iron girders 25 which are carried by the posts 10 and 11 and extend in parallelism with the base girder 12 of the hopper. Desirably flexible members 26, of leather, canvas, or other suitable material, rest upon the edges of the assembling carrier and are secured along their upper edges to angle bars 27 which are connected to the inclined lower portions of the hopper walls and are mounted upon brackets 28 extending upwardly from the girders 25 of the hopper. The flexible members 26, which rest upon the edges of the assembling carrier, prevent the articles from spilling over the edges thereof and are of a material which will not abrade or otherwise injure the surface of the assembling carrier. The recesses in the assembling carrier may be of any suitable form to receive the articles to be assembled in a predetermined position and, of course, may be made of any desired size.

In the operation of the device a mass of articles is placed in the hopper the bottom of which is formed by the upper lead of the recessed assembling carrier. The upper lead of the carrier travels in an upward direction so that the buttons resting thereupon are agitated as the carrier moves beneath the mass. Such movement and agitation causes many of the buttons to become deposited in the recesses and beneath the plane of the surface thereof, while other buttons of the mass, which are improperly engaged by the recesses, are pushed out as the carrier progresses upwardly.

Suitable doffing mechanism is provided at the upper end of the assembling carrier to prevent improperly positioned buttons from being carried from the upper end of the hopper.

Any suitable means may be provided for supporting and driving the assembling carrier 19. One of the features of the present invention, however, comprises novel rollers or drums for supporting the carrier which are illustrated in detail in Fig. 7 of the drawings. These rollers or drums 29 comprise heads having hubs 30 which are fixedly secured upon shafts 31. The peripheries of the heads desirably are recessed to receive the ends of sheet metal drums 32 upon which annular strips 33 of belting, or other suitable material, are riveted to provide an efficient frictional surface to engage the inner face of the assembling carrier 19. The drum heads are secured together by suitable tension rods 34 to form a rigid assembly. Suitable means are provided for driving preferably both of the drums which support the endless carrier as will hereinafter be more fully described.

Any desirable form of mechanism may be employed to remove improperly positioned articles from the recesses of the assembling carrier and return them to the mass, or properly to position them in the recesses of said carrier. In the preferred construction illustrated herein the doffing device comprises a rotating brush 35 which is journalled in suitable bearings 36 mounted on the posts 11 and is actuated by a small electric motor 37 which is mounted upon one of the girders 25. The motor is provided with a small pinion 38 which engages a relatively large gear 39 upon the shaft 40 of the brush. The brush comprises a separated series of spiral rows 41 of bristles, spaced apart sufficiently to receive articles therebetween, which is found to act more effectively to discharge the buttons or other articles than a continuous row of bristles.

It is found in practice that the friction created between the rotating brush and the assembling carrier electrifies the carrier and buttons so that the buttons adhere to the surface of the carrier. Another feature of the invention consists in providing means for discharging the electricity thus generated to prevent such adhesion. In the particular construction illustrated this is accomplished by a series of small metal chains 42 which rest at their lower ends loosely upon the carrier and the buttons therein contained and at their upper ends are connected to a metallic rod or conductor 43 which is connected at its ends to the frame of the machine so that the connection provides a ground which will prevent the accumulation of static electricity upon the surface of the carrier and the buttons.

In order to transfer the buttons which are assembled upon the travelling assembling carrier 19 to a receiving carrier the lower lead of the assembling carrier is caused to sag to a considerable extent and is maintained taut in an arcuate position and the upper lead of a co-operating article-receiving endless conveyer is caused to engage the arcuate surface of the assembling carrier 19 in close proximity to the line at which it passes over the upper drum or roller and to follow said arcuate surface until the lower lead of the assembling carrier is moving in a substantially horizontal direction and is about to move upwardly into engagement with its lower driving drum or roller. The lower lead of the assembling carrier thereupon departs from its engagement with the upper lead of the endless article-receiving conveyer so that the buttons, or other articles, are deposited by the assembling carrier upon the article-receiving conveyer in the same assembled arrangement, but in reverse or inverted position from that assumed by the articles upon the assembling carrier.

In the construction illustrated the lower lead of the assembling carrier is maintained taut and in arcuate form by an arc-shaped presser or guide which comprises side frames having arcuate angle bars 44 connected at their upper ends to plates 45 which are pivotally mounted upon the shaft 31 of the upper drum of the assembling carrier, the upper end of the angle plates 45 being connected to the arcuate plates 44 by struts 46. A plate of sheet metal 47, which is secured to the flanges of the angle bars 44, engages the under surface of the assembling carrier 19. Desirably guiding ribs 48 secured to the angle plates 44 prevent lateral movement of the assembling carrier and conveyer.

Means are provided for adjusting the arcuate guiding means in such a manner as to maintain a proper tension upon the assembling carrier. As illustrated herein these adjusting means comprise turnbuckles 49 which are interposed between the girders 12 of the hopper frame and the strut 46. The endless article-receiving conveyer 50 is of material suitable to the use in which the conveyer is employed and may be of any required length; for example, if the receiving conveyer 50 is employed to transport the assembled articles through the field of a painting or coating mechanism the conveyer should be of wire mesh. If the conveyer is to be employed merely as a sorting table from which imperfect buttons may be removed it may be made of canvas or other suitable material.

Figure 8:
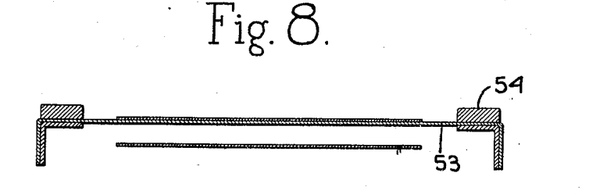
Fig. 8 is a transverse sectional view on line 8—8 Fig. 1, illustrating the support for the endless carrier when employed as an inspection table.

The article-receiving conveyer 50 is mounted upon suitable guide rollers the upper roller 51 being located in proximity to the upper drum of the assembling carrier with its shaft 52 mounted in suitable bearings upon the base girder 12 of the hopper frame. The upper lead of the article-receiving carrier 50 engages the assembling carrier 19 in approximately the vertical tangential plane in which the assembling-carrier passes over the upper roll and continues in contact with the under lead of the assembling carrier throughout the guided arcuate portion thereof until its upper lead is in a substantially horizontal position from which it travels over a suitable support, preferably a metallic sheet 53 which is mounted upon the side girders 4 and clamped thereupon by bars 54 (see Fig. 8), to a roller 55, whence it returns over an under guiding roller 56 to an adjustable guiding roller 57 from which its under lead rises upwardly to pass over the upper roller 51.

Suitable means are provided for adjusting the tension upon the article-receiving conveyer 50. In the construction illustrated the shaft of the guide roller 57 is journalled in bearings 58 which are slidably mounted in ways in brackets 59 carried by the side girders 4 of the main frame. The bearings 58 are connected to hand operated screws 60, or other suitable adjusting means.

Figure 9:
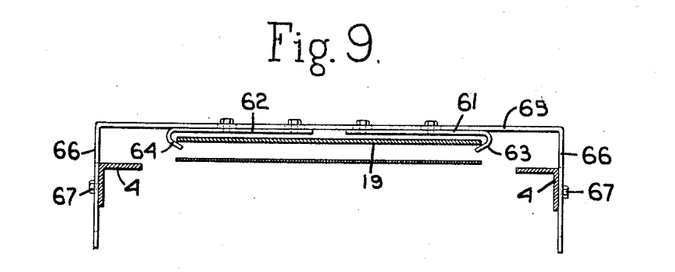
Fig. 9 is a transverse sectional view showing the adjustable guiding means for directing the edges of the travelling carrier as it approaches the lower driving roll.

It is desirable that the article-receiving conveyer 50 and the endless assembling carrier 19 shall be guided accurately and the present invention comprises suitable means for directing the assembling carrier and the article-receiving conveyer in such a manner that they will be presented properly to their respective driving rolls. The guiding means for the assembling carrier is illustrated in detail in Fig. 9 of the drawings and comprises a pair of guides 61 and 62 having downwardly turned ends 63 and 64 positioned to engage the edges of the under lead of the assembling carrier 19, after it leaves its engagement with the article-receiving conveyer, and a short distance in advance of its engagement with the lower driving drum of the assembling carrier. The guides 61 and 62 are adjustably mounted upon a supporting bar or plate 65 which has downwardly turned end portions 66 provided with vertical slots which are engaged by screws 67 seated in the side rails 4. By reason of this construction the guides 61 and 62 can be adjusted lengthwise of the support 65 and the support 65 can be adjusted vertically so that the guides will serve to direct the lower lead of an assembling carrier of any suitable width properly to the lower driving roll 29, and by reason of the curved ends 63, which underlie the edges of the lower lead of the assembling carrier, the proper separation of the lower lead thereof from the upper lead of the article-receiving conveyer 50 is insured.

Figure 10:
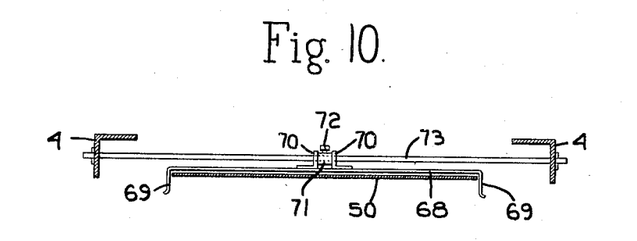
Fig. 10 is a transverse sectional view on line 10—10 Fig. 1, illustrating guiding mechanism for directing the return lead of the endless conveyer to maintain proper relation between said conveyer and the travelling endless carrier.

The means for guiding the lower lead of the article-receiving conveyer 50 is illustrated in Fig. 10 and comprises a guide plate 68 having downwardly turned edges 69 which extend closely adjacent the edges of the lower lead of the conveyer 50. The guide 68 is carried by angle iron brackets 70 which are connected by a collar 71 which is adjustably secured by a set screw 72 upon a rod 73 which extends across and is secured to the flanges of the girders 4. This guide is located in advance of and in proximity to the guiding roller 57 which directs the under lead of the conveyer 50 to its driving guide roll 51.

Any suitable means may be provided for driving the assembling carrier and the article-receiving conveyer, in synchronism. One form of such driving mechanism is illustrated in my prior application aforesaid. An improved form of driving mechanism is shown in the present construction which comprises means readily operable by the operator for controlling the speed of movement of the assembling carrier and article-receiving conveyer. This is particularly convenient where the article-receiving conveyer is employed as a sorting table as illustrated in Fig. 1. The driving mechanism shown in the drawings (Figs. 1, 5 and 6) comprises an electric motor 74 which is carried upon a suitable support 75 mounted upon the girder 6 of the main frame. The shaft of the motor 75 is provided with a pulley 76 which drives a belt 77 which in turn drives a pulley 78 upon a shaft 79 of a speed controlling mechanism. The particular speed controlling mechanism comprises a pair of separated converging cone pulleys 80 and 81 which are feathered upon the shaft 79 and are provided with hubs having pins 82 and 83 which engage slots in levers 84 and 85 which are fulcrumed on pins 86 and 87 upon a suitable supporting frame 88 which is mounted upon the support 75. A countershaft 89, which is also mounted upon the supporting frame 88, is provided with a pair of converging cone pulleys 90 and 91 which are complementary to the pulleys 80 and 81 and have hubs which likewise are feathered upon the countershaft 89.

The ends of the levers 84 and 85 are provided with slots which receive pins 92 and 93 respectively upon sleeves engaging annular recesses in the hubs of the pulleys 90 and 91 repectively. The opposite ends of the levers 84 and 85 are also provided with slots which receive pins 94 and 95 extending from oppositely threaded nuts 96 and 97 which engage respectively opposite screw threads upon a rod 98 which extends lengthwise of the machine and is provided with a pulley 99 to which is secured an endless cable 100 which is located in a position convenient to the operator. An endless belt 101, provided with beveled edges complementary to those of the pulleys 80 and 81 and 90 and 91, extends around the pulleys. By rotating the rod 98 the screw threaded end portions of the rod move the nuts 94 and 95 lengthwise of the rods either toward or away from each other in accordance with the direction in which the pulley 99 is rotated by the cable 100. Such movement rocks the levers 84 and 85 upon their fulcrums 86 and 87 respectively, moving the pulleys 90 and 91 in the opposite direction to the direction of movement of the pulleys 80 and 81. If, therefore, the pulleys 80 and 81 are separated the pulleys 90 and 91 will be correspondingly drawn together and the belt will travel nearer to the shaft 79 and farther toward the periphery of the pulleys 90 and 91, thereby reducing the speed of rotation of the shaft 89 relatively to that of the shaft 79. Adjustment of the pulleys in the opposite direction will increase the speed of the shaft 89 relatively to that of the shaft 79. As the shaft 79 is always rotated by its motor at a constant speed, the speed of the countershaft may be varied at will as will be obvious.

Figures 5, 6, 7:
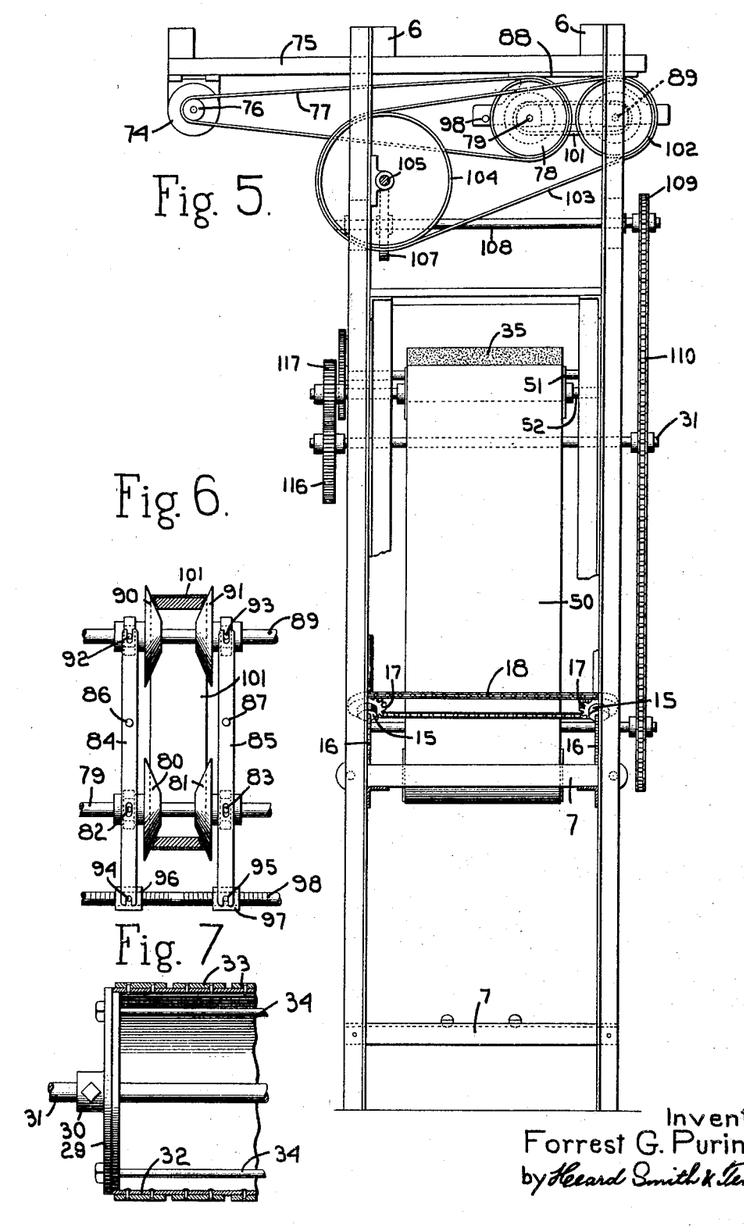
Fig. 5 is an end elevation of the mechanism illustrated in Fig. 1.
Fig. 6 is a detail view of the controlling mechanism for regulating the speed of the assembling mechanism.
Fig. 7 is a detail view, partially in section, of a preferred form of one of the drums or rollers of the travelling endless carrier.

The countershaft 89 is provided with a pulley 102 which drives a belt 103 which in turn drives a pulley 104 upon a worm shaft 105, the worm 106 of which engages a worm gear 107 on a shaft 108 which is provided with a sprocket wheel 109 which in turn drives the assembling carrier and also the article-receiving conveyer. In the driving construction which is illustrated in Figs. 1 and 5 particularly the sprocket wheel 109 drives a sprocket chain 110 which passes beneath a toothed tension roller 111, the shaft 112 of which is mounted upon a counterweighted lever 113 and thence passes over a sprocket wheel 114 which is secured to the shaft 31 of the upper drum of the endless assembling carrier. The sprocket chain then passes around the sprocket 115 which is fixedly secured to the shaft of the lower drum of the assembling carrier and thence returns to the sprocket 109. The shaft 31 of the upper drum of the endless carrier is also provided with a gear 116 which engages a complementary gear 117 upon the shaft 52 of the driving drum 51 of the article-receiving conveyer 50. By reason of this construction the assembling carrier and the article-receiving conveyer are driven in synchronism and the speed of movement thereof may be readily controlled by the operator.

Figure 12:
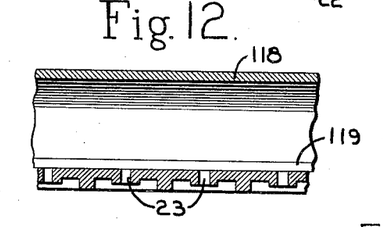
Fig. 12 is an enlarged longitudinal sectional view illustrating pneumatic means for insuring the discharge of buttons from the assembling belt or carrier.

Suitable means are provided for insuring the transfer of the buttons, or other articles, from the assembling carrier 19 to the article receiving conveyer 50. In my previous application the means for accomplishing this purpose comprised a tappet device which acted upon the inner face of the assembling carrier at approximately the horizontal line of its separation from the article-receiving conveyer 50. In the present construction a pneumatic discharging device is employed. This construction is illustrated in detail in Figs. 12 and 13 of the drawings and comprises a pipe 118 which extends transversely of the machine a short distance beyond the end of the arcuate guide 47, the lower end of which is provided with a longitudinally extending slot 119 with which the recesses 23, through the assembling carrier 19, register momentarily as the assembling carrier passes along. Air under pressure is introduced into this pipe and acts when the recesses 23 are in registry with the slot 19 to force the buttons from the recesses in the assembling carrier so that they are deposited properly upon the receiving and transporting conveyer 50.

In the operation of the device, as illustrated in Fig. 1, a mass of buttons is placed in the hopper and is replenished from time to time while the machine is in operation until the mass of buttons extends from the lower end of the hopper a greater portion of the way to the upper end thereof. The speed of the machine is controlled by the operator through the cable 100 as described. The driving mechanism actuates the travelling endless assembling carrier and the article-receiving conveyer in synchronism. As the upper lead of the assembling carrier passes upwardly beneath the mass of buttons, buttons which rest upon it with their faces down will enter the recesses in the carrier, while other buttons whose faces do not engage the carrier will slide down upon the same; thus the recesses in the carrier will be substantially filled with buttons during their progress beneath the mass of buttons. Any excess of buttons, or improperly positioned buttons, which reach the upper end of the hopper are thrown back into the hopper by the rotating doffing brush. As the assembling carrier 19 passes progressively over the upper drum it is engaged by the upper lead of the article-receiving conveyer 50 which passes in close contact therewith throughout the entire length of the lower lead of the assembling carrier which is held in arcuate position by the guide 47. When the lower lead of the assembling carrier and upper lead of the article-receiving conveyer have reached a substantially horizontal position the buttons are completely transferred from the assembling carrier to the article-receiving conveyer and are then carried along in a horizontal plane. As illustrated in Fig. 1 this horizontal portion of the article-receiving conveyer is employed as a sorting table. The speed-controlling cable is located near the end of this table in convenient reach of the operator so that the speed of the machine can be controlled to suit the sorting requirements. The buttons which are not removed from the article-receiving conveyer during the sorting process are discharged into a suitable receptacle at the end of the conveyer.

It has been heretofore stated that in the construction illustrated in Fig. 1 the buttons are assembled upon the assembling carrier right side up and when transferred to the receiving conveyer are presented wrong side up. By the introduction of an additional transferring endless carrier intermediate of the assembling carrier and the receiving and conveying carrier, means may be readily provided to reverse the buttons again so that they will be presented upon the transporting carrier right side up. Such a mechanism is illustrated in Fig. 2 and corresponds generally to the construction shown in my prior application. The hopper and assembling carrier construction illustrated in Fig. 2 may be and desirably is the same as that illustrated in Fig. 1 as will be seen by identical numerals indicating like parts. The mechanism for adjusting the inclination of the hopper, shown in Fig. 2, differs from that illustrated in Fig. 1 in that the vertical standards 120 of the main frame are provided with a series of pin holes 121 through a pair of which pins may be inserted into the girders 11 of the hopper frame to support the hopper at any desired inclination relatively to the horizontal plane of its pivotal shaft 13. The article-receiving conveyer 50 in this construction desirably is of canvas and constitutes a transferring rather than a transporting conveyer. The lower end of the conveyer 50 passes around a driving drum 122, the shaft of which is mounted upon the vertical standard 123 in proximity to the pivotal shaft 113 for the lower end of the hopper frame. A supplemental article-transporting conveyer 124, which may be made of canvas, or other suitable material, if the device is to be employed as a sorting machine, or of wire screen if the transporting conveyer is to be employed with a painting, coating, or other machine, passes around a drum 125 the shaft of which is mounted upon bearings carried by the standards 123 and located directly above the drum 122. The supplemental article-transporting conveyer 124 after passing around the drum 122 engages the upper lead of the article-receiving conveyer 50 upon which the buttons, or other articles, have been deposited in assembled position by the assembling carrier. It continues in such engagement throughout substantially one-half of the periphery of the drum 122 and then extends in a horizontal direction over suitable supports and guides not shown. The return lead of the supplemental article-transporting conveyer 124 is guided over an idle pulley 126, thence over an adjustable pulley 127, thence around an idle pulley 128, the shaft of which is journalled in bearings 129 mounted upon an extension of the hopper-supporting frame 12. The mechanism for driving the assembling carrier and conveyers is similar to that illustrated in Fig. 1 with only such modifications as are necessary to actuate the supplemental article-transporting conveyer 124.

In the construction illustrated the worm shaft 105, which is driven from the countershaft of the speed regulating mechanism, is provided with a worm 130 which engages a worm gear 131 upon the shaft 132 carried by the standard 123. The shaft 132 has secured to it a pair of sprocket gears one of which drives a sprocket chain 133 which passes beneath a tension sprocket 134, thence around a sprocket wheel upon the shaft 31 of the upper drum of the assembling carrier 19, thence around the sprocket wheel upon the shaft of the lower drum 29 of the assembling carrier, thence returning to the sprocket wheel upon the shaft 132. The other sprocket wheel on the shaft 132 drives a sprocket chain 135 which in turn drives a sprocket wheel 136 upon the shaft of the driving drum for the supplemental article-transporting conveyor 124.

The operation of the mechanism will be obvious. Buttons deposited in the hopper 8 rest upon the endless assembling carrier 19 and those which enter the recesses 20 thereof, (Fig. 3), with the faces downward will be retained in the recesses, while those which otherwise engage the recesses will be displaced by the upward movement of the assembling carrier as it passes beneath the mass and as the carrier passes over the upper drum will be thrown back by the brush (not shown) in the manner as heretofore described in reference to the construction shown in Fig. 1. The buttons contained in the recesses of the assembling carrier will then be engaged by the upper lead of the article-receiving conveyer 50 and maintained in contact therewith by the arcuate guide 47 and as the endless carrier 19 separates from the article-receiving conveyer will be deposited upon the article-receiving conveyer with the upper faces exposed. As the article-receiving conveyer 50 passes around the drum 122 it is engaged by the upper lead of the supplemental transporting conveyer 124 which passes in contact with the article-receiving conveyer 50 around approximately one-half of the periphery of the drum 122 to the horizontal position illustrated. As the lower lead of the article-receiving conveyer 50 separates from its engagement with the upper lead of the supplemental transporting conveyer 124, the buttons are transferred from the article-receiving conveyer to the supplemental transporting conveyer, being deposited thereupon with the obverse faces exposed, as illustrated. The supplemental transporting conveyer may be continued to provide a sorting table, or if desired may be passed through a coating, or painting field, a drying field, and may be further extended to provide a sorting table as heretofore described.

In Fig. 14, a diagrammatic assemblage is shown of the assembling and transporting mechanisms as embodied in a button painting machine. In this construction an assembling mechanism corresponding to that shown in Fig. 2 is shown at the right end of the drawing and comprises a hopper 8, an assembling carrier 19 of the character above described which deposits the buttons in assembled position upon the article-receiving carrier 50 from which carrier the buttons are transferred to the supplemental transporting carrier 124 as shown in Fig. 2, the buttons being deposited upon this carrier with the backs of the buttons exposed. The upper lead of this transporting carrier passes through a painting field in which paint is deposited upon the buttons by an air brush 137 in a manner more fully described in my prior application aforesaid. The upper lead of the conveyer continues through a drier 138 in which the paint, which has been deposited upon the backs of the buttons, is baked and the buttons are then discharged upon a conveyer 139 which deposits them upon an endless elevator 140 by means of which they are carried upwardly and delivered to the hopper 8 of an assembling mechanism like that illustrated in Fig. 1. The assembling carrier 19 of this conveyer deposits the buttons face upwardly upon the endless conveyer 50 which in this instance constitutes a transporting conveyer extending through the field of the painting mechanism 141 and the drier 142 so that the faces of the buttons are coated and the buttons thus finished. The conveyer 50 desirably projects a sufficient distance beyond the drier to provide a sorting table 143 from the end of which the buttons remaining upon the conveyer after the sorting operation are deposited in a suitable receptacle 144.

It will be obvious that the invention may be employed in various other relations and it will be understood that the particular embodiments of the invention disclosed herein are illustrative and not restrictive of the scope of the following claims.

Having thus described the invention, what is claimed as new, and desired to be secured by Letters Patent, is:

1. In an article assembling and conveying machine, assembling means comprising a hopper having a bottom comprising the upper lead of a travelling endless carrier provided with closely associated recesses shaped to receive and remove from a mass of articles in said hopper only such articles as are presented to said recesses in a predetermined position, a presser plate engaging the lower lead of said endless carrier and acting to maintain the same taut, and a travelling conveyer moving in synchronism with said travelling carrier arranged progressively to receive the assembled articles therefrom in the same juxtaposition and to travel with the lower lead of said endless carrier along said presser plate to a substantially horizontal position.

2. In an article assembling and conveying machine, assembling means comprising a hopper having a bottom comprising the upper lead of an upwardly inclined travelling endless carrier provided with closely associated recesses shaped to receive and remove from a mass of articles in said hopper only such articles as are presented to said recesses in a predetermined position, a presser plate engaging the lower lead of said endless carrier and acting to maintain the same taut, means for adjusting said presser plate and a travelling conveyer arranged progressively to receive the assembled articles from said endless carrier in the same juxtaposition and to travel with the lower lead of said endless carrier along said presser plate.

3. In an article assembling and conveying machine, assembling means comprising a hopper having a bottom comprising an upwardly inclined travelling endless carrier provided with closely associated recesses shaped to receive and remove from a mass of articles in said hopper only such articles as are presented to said recesses in a predetermined position, means for adjusting the inclination of said hopper and carrier comprising screw threaded extensible members supporting respectively the sides of the hopper, nuts on said screw threaded members and means for simultaneously rotating said nuts and a travelling conveyer arranged progressively to receive the assembled articles from said travelling carrier in the same juxtaposition.

4. In an article assembling and conveying machine, assembling means comprising a hopper having a bottom comprising an upwardly inclined travelling endless carrier provided with closely associated recesses shaped to receive and remove from a mass of articles in said hopper only such articles as are presented to said recesses in a predetermined position and rotating means co-operating with said endless carrier acting to prevent the removal from said hopper of such articles as are not properly seated within said recesses and means for preventing adhesion of said articles to said travelling carrier by electrification.

5. In an article assembling and conveying machine, assembling means comprising a hopper having a bottom comprising an upwardly inclined travelling endless carrier provided with closely associated recesses shaped to receive and remove from a mass of articles in said hopper only such articles as are presented to said recesses in a predetermined position, rotating means co-operating with said endless carrier acting to prevent the removal from said hopper of such articles as are not properly seated within said recesses and means for preventing adhesion of said articles to said travelling carrier by electrification comprising a series of flexible electric conductors positioned to engage said articles and carrier and having a ground connection.

6. In an article assembling and conveying machine, assembling means comprising a travelling endless belt to support a mass of said articles having opposite faces of different contour and provided with closely associated recesses complementary to one of the faces of said articles and of a depth at least equal to the thickness of the edge of said article to receive and remove from said mass only such articles as substantially fit said recesses and a travelling assembled-article receiving conveyer engaging a loaded section of said assembling carrier and moving in synchronism therewith to receive the assembled articles therefrom in reversed position.

7. In an article assembling and conveying machine, assembling means comprising an inclined hopper having a bottom comprising the upper lead of a travelling endless carrier provided with closely associated recesses to receive and remove from a mass of articles in said hopper only such as are presented to said recesses in a predetermined position, an arcuate guide engaging the upper face of the under lead of said endless carrier, a travelling assembled-article receiving conveyer having its upper lead engaging said assembling carrier and held in close engagement therewith by said arcuate guide to a position in which the upper lead of said conveyer travels a substantially horizontal plane, whereby said articles will be received by said conveyer from said assembling carrier in the same juxtaposed relation.

8. In an article assembling and conveying machine, assembling means comprising an inclined hopper having a bottom comprising the upper lead of a travelling endless carrier provided with closely associated recesses to receive and remove from a mass of articles in said hopper only such as are presented to said recesses in a predetermined position, an arcuate guide engaging the upper face of the under lead of said endless carrier, a travelling assembled-article receiving conveyer having its upper lead engaging said assembling carrier and held in close engagement therewith by said arcuate guide to a position in which the upper lead of said conveyer travels a substantially horizontal plane, whereby said articles will be received by said conveyer from said assembling carrier in the same juxtaposed relation, means for adjusting said arcuate guide and means for adjusting the tension upon said conveyer to maintain said carrier and conveyer in proper engagement.

9. In an article assembling and conveying machine, assembling means comprising a travelling endless carrier to support a mass of said articles and provided with closely associated recesses to receive and remove from said mass only such articles as are presented to said recesses in a predetermined position, a travelling assembled-article receiving conveyer engaging a loaded section of said assembling carrier and moving in synchronism therewith to receive the assembled articles therefrom in reversed position, a supplemental travelling article-transporting conveyer engaging a portion of said article-receiving conveyer arranged to receive the articles in obverse position and to transport the assembled articles in a substantially horizontal plane to a place remote from said assembling carrier to permit inspection of said articles, means for driving said assembling carrier and said conveyer, and means operable from the vicinity of said place of inspection to vary the speed of said article-receiving carrier and said conveyer.

10. In an article assembling and conveying machine, assembling means comprising a travelling endless carrier to support a mass of said articles and provided with closely associated recesses to receive and remove from said mass only such articles as are presented to said recesses in a predetermined position, and having relatively smaller openings extending from said recesses through said carrier, a travelling assembled-article receiving conveyer having a section engaging a loaded section of said assembling carrier and moving in synchronism therewith to receive the assembled articles therefrom in reversed position and means located in proximity to the line of separation of said engaging sections operable to project air through said apertures to insure the transfer of said articles from the assembling carrier to the travelling assembled article receiving conveyer.

11. In an article assembling and conveying machine, assemblng means comprising a hopper to receive a mass of articles and having a bottom comprising an upwardly inclined endless carrier provided with closely associated article receiving recesses shaped to receive the articles in a predetermined position, upper and lower drums supporting said carrier, means for rotating the lower drum, a travelling article receiving conveyer engaging a loaded section of said carrier and moving in synchronism therewith, guiding members positioned to engage the edges of said assembling carrier positioned in advance of and in proximity to the lower driving roller and means for adjusting said guiding members.

12. In an article assembling and conveying machine, assembling means comprising a hopper having a bottom comprising a flexible travelling endless carrier provided with closely associated recesses shaped to receive and remove from a mass of articles in said hopper having opposite faces of different contour only such articles as are presented to said recesses in a predetermined position, a travelling endless conveyer associated with said endless carrier and moving in synchronism therewith, arranged progressively to receive the assembled articles in the same juxtaposition and to transport the same to a place remote from said endless carrier to permit inspection thereof, means located in proximity to said assembling carrier for actuating said assembling carrier and said travelling conveyer, and means for varying the speed of said assembling carrier and said conveyer, and means located in proximity to the place of inspection for controlling said speed-varying means.

In testimony whereof, I have signed my name to this specification.

FORREST G. PURINTON.